United States Patent
De Sadeleer et al.

(10) Patent No.: US 6,176,916 B1
(45) Date of Patent: *Jan. 23, 2001

(54) GLUTEN LACTOSE BLENDS

(75) Inventors: Jos Willy Ghislain Corneel De Sadeleer, Holsbeek (BE); Cornelis Bos, Dinteloord (NL)

(73) Assignee: Cerestar Holding B.V., LA Sas van Gent (NL)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/847,332

(22) Filed: Apr. 23, 1997

(30) Foreign Application Priority Data

Apr. 23, 1996 (GB) .................................... 9608374

(51) Int. Cl.[7] .................................................... C08L 89/00
(52) U.S. Cl. .................................. 106/126.1; 106/124.2; 426/580; 426/635; 426/656
(58) Field of Search ............................ 106/124.2, 126.1; 127/29; 426/580, 635, 656

(56) References Cited

U.S. PATENT DOCUMENTS

| 3,372,032 | 3/1968 | van Tittelboom . |
| 3,840,670 | 10/1974 | Holt . |
| 3,956,521 | * 5/1976 | Pisecky et al. ........................ 426/588 |
| 5,397,589 | * 3/1995 | Korte et al. ........................... 426/580 |
| 5,643,622 | * 7/1997 | Sawhill .................................. 426/41 |

FOREIGN PATENT DOCUMENTS

| 446 987 | 9/1991 | (EP) . |
| 1121946 | 7/1968 | (GB) . |
| 1 343 578 | 1/1974 | (GB) . |
| 2 294 859 | 5/1996 | (GB) . |
| 93/00826 | 1/1993 | (WO) . |

OTHER PUBLICATIONS http://conquestine.com/mountainbrookfoods/facts/Nonfat-powderedmilk.html, May 30, 2000.*
Database WPI Week 9501 Derwent Publication Ltd., London,GB: an 95–003932 XPOO2O15379 & KR–A–9 400 957 (Sun Hil Glucose Co Ltd.), Feb. 7, 1994.

* cited by examiner

Primary Examiner—David Brunsman
(74) Attorney, Agent, or Firm—Pillsbury Madison & Sutro LLP

(57) ABSTRACT

The present invention discloses a non-hygroscopic free-flowing product comprising a hydrophobic and a hydrophilic component. Preferred products comprise a hydrophobic protein such as corn gluten meal together with hygroscopic components such as lactose, dextrose and choline such as whey permeate. The present invention further discloses a method for making such a product. Furthermore animal feed compositions containing the non-hygroscopic free-flowing product are disclosed.

5 Claims, 1 Drawing Sheet

GLUTEN LACTOSE BLENDS

TECHNICAL FIELD

The present invention relates to non-hygroscopic free-flowing products in general. Such products are composed of a hydrophobic and a hydrophilic material and are obtained by the co-drying of these materials. Specifically, the present invention discloses a non-hygroscopic free-flowing product consisting of a sugar and a protein component. A case in point is a mixture of lactose and gluten which is suitable for use in animal feed compositions. The present invention also relates to a method for obtaining such products and to feed compositions containing the products.

BACKGROUND OF THE INVENTION

Hygroscopic materials are generally difficult to handle. When the material is used in dry form it attracts water and thereby becomes sticky and difficult to treat mechanically. This limits the use of hygroscopic materials to use in wet or solubilized form. Use of wet materials at a distance from the place at which they are produced involves the transport of water which is considered as a wasteful process step.

A case in point is the use of lactose. Lactose (or milk sugar) is virtually the only sugar in milk. Lactose is a disaccharide composed of glucose and galactose. This sugar is present in cow milk at an average amount of 4.8% (w/w) and contributes to the nutritive value of milk and milk products, other sources for lactose are known. Lactose can be purified from milk or milk products. The most important source of lactose is the cheese industry. Lactose is an important component of whey permeate (about 80% lactose) which is a by-product of cheese manufacturing. Whey permeate therefore is considered as a very important nutritive product. Whey permeate is fed to animals or it is disposed. There is a growing tendency to valorize such by-products, especially in the form of animal feed.

In modern farming the feed given to animals is closely monitored with respect to its composition and nutritional value. Feed mixes are carefully prepared and the composition is varied with the species, age and physiological status of the animals. Lactose (in the form of whey permeate) which could be an interesting component of animal feed is hardly used due to its hygroscopic behavior. Dry feed compositions containing lactose become sticky and difficult to handle. Mixing of dried whey permeate together with other feed components also gives a hygroscopic product. The present invention solves this problem.

SUMMARY OF THE INVENTION

The present invention discloses a non-hygroscopic free-flowing product comprising a hydrophobic and a hydrophilic component. Specifically, the present invention discloses a non-hygroscopic free-flowing composition comprising a sugar and a protein component. More specifically lactose and a hydrophobic component.

The present invention discloses a method for obtaining a non-hygroscopic free-flowing product comprising the co-drying of a thoroughly mixed composition containing hydrophobic and hydrophilic materials.

The present invention further discloses the use of the non-hygroscopic free-flowing product as an animal feed component.

The invention also discloses animal feed compositions in which the product is used as a milk replacer.

DETAILED DESCRIPTION OF THE INVENTION

Figure 1:
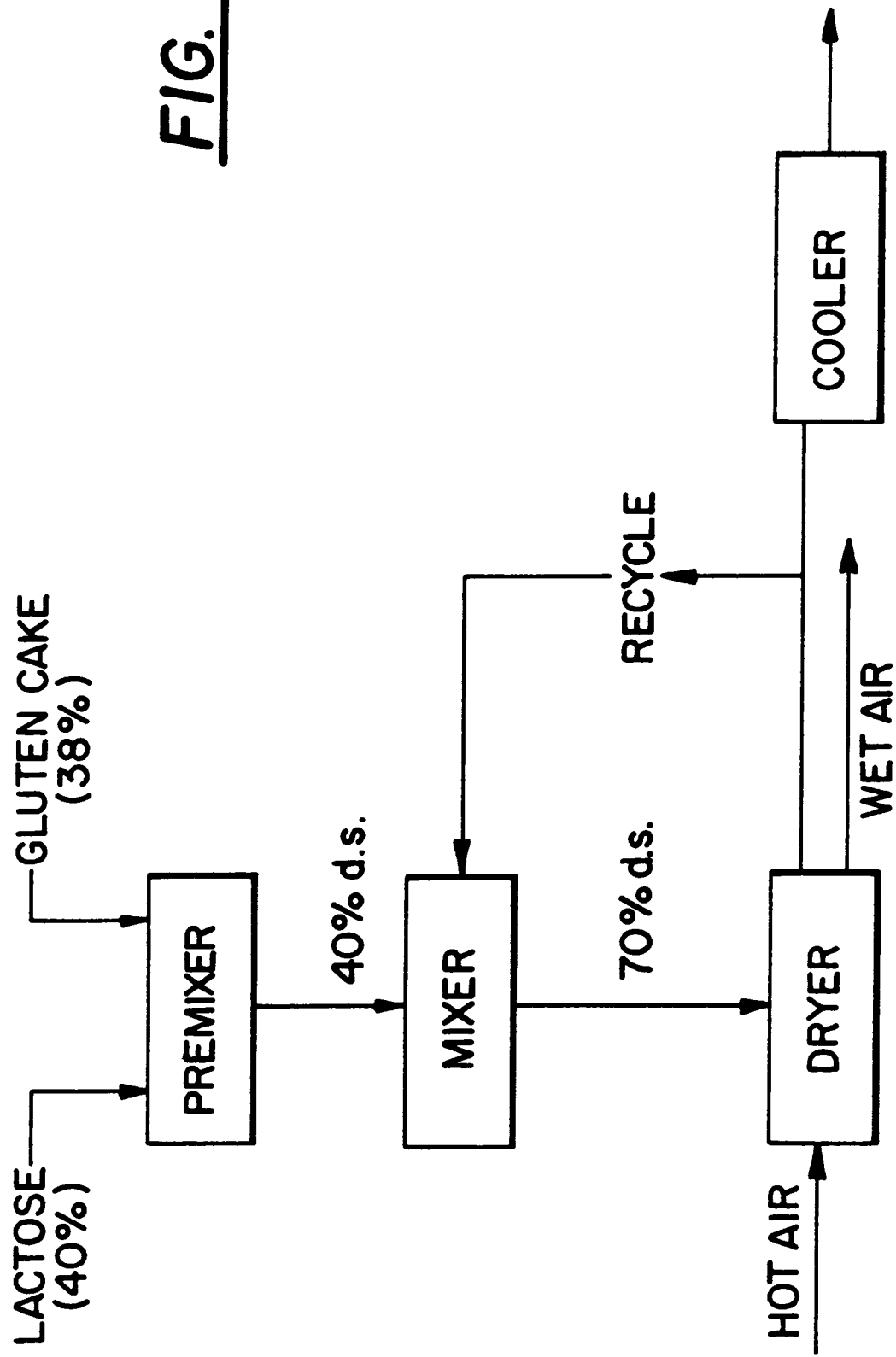
FIG. 1 is an example of a process, according to the present invention, for obtaining a non-hygroscopic free-flowing lactose/gluten blend.

The present invention discloses a non-hygroscopic free-flowing product comprising a hydrophobic and a hydrophilic component. The hydrophilic component can be any product which is normally found to be hygroscopic and which due to this is difficult to handle.

The present invention is illustrated by the use of hygroscopic components such as sugars, notably lactose (in the form of whey permeate), dextrose and choline. Lactose, which is also available in other forms than whey permeate for example purified (dried) lactose or as sweet whey powder, can also be used as starting material for the present invention.

Other possible hygroscopic products which are advantageously treated by the method of the present invention are di-, tri- and polysaccharides, maltodextrins, fructo-oligosaccharides, isomalto-oligosaccharides and gluco-oligosaccharides.

The hydrophobic components of the present invention are selected from the group consisting of gluten meal (for example wheat gluten or corn gluten) and hydrophobic proteins.

For commercial applications when the composition comprises lactose and gluten these components are preferably mixed in such a way that the amount of lactose is maximal while at the same time the final product should not be hygroscopic. In this way the maximal amount of lactose can be used in a minimal volume.

As exemplified hereinafter to obtain a non-hydrophobic composition containing lactose and gluten the amount of gluten should be higher than a certain percentage of the total. Based on the total of gluten (protein) and lactose (sugar) the gluten are present in an amount of between 30 and 99% of the product and the amount of lactose is between 1 and 70% of the product. Depending on the type of gluten and the presence of other components hydrophobic products have been obtained between these limits.

When starting with corn gluten meal and lactose in the form of whey permeate the ratio between these products is at least 30:70 (w/w) preferably at least 40:60 more preferably in a ratio of 50:50. In the present context gluten meal is considered as the commercially available product which in the case of corn gluten contains 60 to 65% of protein. If other types or forms of gluten are used the amount is corrected for the amount of protein contained therein. Whey permeate contains 80% lactose.

We have found that in order for the composition to be non-hygroscopic and free-flowing a special preparation method has to be followed. This method comprises the following steps;

a) preparing a homogeneous mixture of the hydrophobic and hydrophilic components to be dried, b) drying of the mixture, c) cooling of the dried mixture.

It is important that the process outlined above is correctly performed. Therefore care has to be taken of the following important conditions.

A homogeneous mixture of the components to be co-dried has to be made prior to entering the dryer. If mixing is performed with concomitant drying the material has a tendency to stick to the walls of the dryer. The type of mixing device or homogeniser is not critical as long as they are able to homogenize the mixture completely.

The drying temperature should be limited to avoid a dark colored product in case of co-drying sugars and protein (Maillard reaction).

After drying it is necessary to cool the product to avoid brown coloring in case of sugar/protein combination. Any type of cooler can be used, even a pneumatic conveying system is sufficient.

Starting with gluten and whey permeate the product of the process of the present invention is a dried non-hygroscopic free-flowing composition. When the components are not thoroughly mixed or are spray dried together, the final mixture is sticky and hygroscopic. In general terms the drying is performed in a co- or countercurrent adiabatic drying process.

An example of the process according to the present invention is illustrated in FIG. 1.

Starting with gluten in the form of a cake (about 38% ds) the cake is premixed with a whey permeate solution containing 80% (w/w dry base) lactose.

The temperature of the whey permeate solution is kept at such a value that the lactose does not crystallize. This mixture is mixed with recycled dried product. The dried beads are thus covered with a lactose/gluten mixture. The ratio between mixture and recycled product is chosen in such a way that the product entering the dryer has a dry solids content of about 70%. This solids contents may vary according to the components in the composition and the type of dryer. This mixture is dried. The dryer may be a rotary or kiln dryer which is adiabatic and equipped with an external recycle. Alternatively it may be a flash (pneumatic conveying) dryer with or without recycle. It is further possible to use a fluid bed dryer with or without recycle. Variations of the type of dryer, amount of recycle and water content of the premixes or mixes are evident to the man skilled in the art and fall therefore within the scope of the present invention. For example it is evident that it is not important what the dry solids content of the gluten cake and whey permeate is for they can always be diluted or concentrated prior to use. It is however important that the lactose does not crystallize.

After drying the product is cooled to avoid coloring.

The product of the process of the present invention consists of particles which are hard and free-flowing. The particles can be milled to obtain a powder which was still found to be non-hygroscopic. When the mixture of the present invention is dried in a flash dryer the product is immediately in the powdered form no milling is then required.

In general the product of the present invention is used as a raw material, ingredient or carrier for the feed or food industry depending on the type of components which are used.

The product is for example used in feed, feed concentrates or premixes. The product can be used as milk replacer in animal feed for example in pig feed, preferably in starters or prestarters and in calf milk replacers.

In prestarters the lactose is added in an amount of from 1 to 40% (w/w) in starters the amount is between 1 and 20% (w/w).

Depending on the amino acid composition of the gluten or other hydrophobic proteins which are used in the process of the present invention it may be necessary to add amino acids to the product in the premix or starter before it can be used as animal feed. For example the use of corn gluten in specific applications requires added lysine. Instead of adding the necessary amino acids to the starter or premix it is possible to add them to the mixture of the present invention. The same is possible for other necessary ingredients such as vitamins. Care should be taken that the added components are not damaged during the drying process.

The examples illustrate that the product of the present invention is non-hygroscopic and free-flowing it is also illustrated how the products of the present invention are manufactured.

Example 1 illustrates the use of a combination of whey permeate and corn gluten.

Examples 2 and 3 show the effect of using different types of dryers. The procedure for preparing the permeate/gluten mixture as described in example 1 was repeated using successively a pneumatic conveying dryer and a spray dryer. It is shown that the spray dryer gives rise to a product which still has the characteristics of the whey permeate i.e. hygroscopic and sticky. The spray drier in this case probably did not give enough mixing.

Example 4 shows that different amounts of gluten and whey permeate can be used to obtain the desired product. Preferably gluten should be present in at least 50% (w/w).

In Examples 5 and 6 the whey permeate is replaced with dextrose and choline which are other known hygroscopic compounds.

Example 7 shows that corn gluten can be replaced by wheat gluten.

The present invention is illustrated by the following examples.

EXAMPLE 1

A mixture, containing 40% corn gluten and 60% whey permeate on dry basis, was prepared by using fresh corn gluten cake of 38% dry substance and a whey permeate solution of 40% solids and 60° C.

This whey permeate solution was made by resolubilising spray dried whey permeate powder, consisting of 80% lactose, in hot water. The solution was maintained at 60° C. to avoid crystallization of the lactose.

The gluten cake was then mixed with the permeate solution in an open mohnopump and subsequently sent to a tank with a strong agitator. This tank serves as an extra mixing stage to disperse the gluten cake completely in the permeate solution. The temperature of the mixture is not critical.

The mixture was then supplied to a direct heat rotary drier with external dry product recycle and an external paddle mixer for premixing dry recycle with the liquid supply. This dry product recycling is necessary to overcome the sticky nature of the gluten/permeate mixture. The drying temperature (inlet air and outlet air temperature) should be limited to avoid a dark colored burned product.

After drying the product was cooled down to 25° C. in a fluid bed cooler to avoid caking and brown coloring of the product during transit and storage especially in hot, humid areas.

The discharged product is a free-flowing granular material with a bright yellow color. The hydrophilic whey permeate is completely embedded in the hydrophobic corn gluten resulting in a non-hygroscopic final product. Additionally, the product retains its non-hygroscopic character after milling.

The rotary dryer has the advantage of making a product with good handling characteristics that is not considered dusty.

EXAMPLES 2 AND 3

Examples 2 and 3 show the effect of changing the dryer type. The procedure for preparing the permeate/gluten mixture as described in example 1 was repeated using successively a pneumatic conveying dryer and a spray dryer. After drying the product was cooled down to 25° C.

In the first test the mixture was introduced into a pneumatic conveying dryer with internal and external dry product recycle and an external paddle mixer for premixing dry recycle with incoming liquid to become a suitable feed. The feed was then dispersed in the hot air stream by means of a desintegrator which simultaneously grinds the product. As the retention time is very short in this type of dryer the drying reaction must be mainly a surface phenomenon or the solid particles must be very small. Therefore the disintegration step is usually required.

The co-dried product is a powder and thus more dusty and less dense compared to the material dried in the rotary dryer. It is however free flowing and non-hygroscopic which indicates that the permeate is completely embedded into the corn gluten. Due to the short retention time the possibility of producing brown colored product is less compared to the rotary dryer.

In the second test the mixture was supplied to a spray dryer. In this type of dryer the material is sprayed in the form of small droplets into a cylindrical vertical chamber into which a large volume of hot gas is fed. Coarse dried particles are separated from the cooled gas at the bottom of the drying chamber whereas fine particles are separated from the gas in external cyclones. In the co-drying test, the coarse fraction collected at the bottom of the dryer contained mainly gluten and the fine fraction collected in the cyclones consisted mainly of whey permeate. This means that during drying the permeate/gluten mix is separated again in dry permeate and dry gluten. The final product is thus similar to a mix of dry permeate and dry gluten. The hygroscopic character of this product is comparable to the hygroscopic character of pure permeate powder.

EXAMPLE 4

This example illustrates the influence of varying permeate/gluten blend composition. Using the basic procedure outlined in example 1 co-dried products were produced containing different amounts of corn gluten. The following mixtures were prepared
10% gluten meal and 90% permeate product 1
30% gluten meal and 70% permeate product 2
40% gluten meal and 60% permeate: product 3
75% gluten meal and 25% permeate: product 4

The first two products have a light beige color due to the low amount of corn gluten. Part of the permeate is at the outside of the particles. As a result the particles tend to stick together. Product 3 and 4 are yellow at the outside while the internal part has a lighter color. This indicates that the permeate is completely embedded into the gluten. These products have the best hygroscopic characteristics. Increasing the amount of corn gluten in the co-dried product improves hygroscopicity and flowability.

EXAMPLES 5 AND 6

The basic procedure from example 1 was repeated using successively dextrose and choline instead of whey permeate. During drying the hygroscopic dextrose (or hygroscopic choline) is embedded into the corn gluten matrix resulting in a free flowing non-hygroscopic product.

EXAMPLE 7

The basic procedure from example 1 was repeated using wheat gluten instead of corn gluten. The resulting product is more hygroscopic than the product containing corn gluten if hydrolyzed because wheat gluten are then less hydrophobic than corn gluten.

What is claimed is:

1. A non-hygroscopic free-flowing product consisting of corn gluten meal and whey permeate, wherein the corn gluten meal is present in an amount of 40–99% (w), the whey permeate is present in an amount of between 1 and 60% (w/w), wherein the corn gluten meal and whey permeate are thoroughly mixed and the ratio of corn gluten meal to whey permeate is at least 40:60 (w/w).

2. A non-hygroscopic free-flowing product according to claim 1, wherein the product consists of corn gluten meal and whey permeate in a ratio of at least 60:40 (w/w).

3. A non-hygroscopic free-flowing product according to claim 1, wherein the free-flowing product comprises a powder.

4. A non-hygroscopic free-flowing product according to claim 1, wherein the product comprises a free-flowing granular material.

5. A non-hygroscopic free-flowing product according to claim 1, wherein the product is comprised of free-flowing particles.

* * * * *